United States Patent
Lehovec

[15] 3,705,308
[45] Dec. 5, 1972

[54] PULSE CODED SOUND REPRODUCTION USING OPTICAL READ-OUT OF THE MICROPHONE MEMBRANE

[72] Inventor: Kurt Lehovec, 11 Woodlawn Drive, Williamstown, Mass. 01267

[22] Filed: Nov. 16, 1970

[21] Appl. No.: 89,843

Related U.S. Application Data

[63] Continuation-in-part of Ser. Nos. 692,051, Dec. 20, 1967, Pat. No. 3,546,469, and Ser. No. 32,160, April 27, 1970, Pat. No. 3,649,837.

[52] U.S. Cl. ......250/217 SS, 250/231 R, 350/162 ZP
[51] Int. Cl. ........G01d 5/34, G02b 5/18, H01j 39/12
[58] Field of Search.................250/231, 239, 217 SS; 350/162 ZP

[56] References Cited

UNITED STATES PATENTS

| | | | |
|---|---|---|---|
| 3,551,682 | 12/1970 | Kerhoas | 250/217 SS X |
| 3,082,328 | 3/1963 | Mohring | 250/231 |
| 3,293,513 | 12/1966 | Biard et al. | 250/217 SS X |
| 3,245,002 | 4/1966 | Hall | 250/217 SS X |
| 3,475,617 | 10/1969 | Chaimowicz | 250/239 |
| 2,437,608 | 3/1948 | Long et al. | 250/231 R |

OTHER PUBLICATIONS

Krajewski, W. F., "photosensing Using GaAs Light Emitting Diode", IBM Technical Disclosure Bulletin Vol. 9, No. 2, July 1966, p. 202

Primary Examiner—Walter Stolwein
Assistant Examiner—T. N. Grigsby

[57] ABSTRACT

The vibrations of a membrane are read out by means of a pulsed light beam incident on a photoelectric sensor. Integrated sensor amplifier structures are used.

9 Claims, 7 Drawing Figures

PULSE CODED SOUND REPRODUCTION USING OPTICAL READ-OUT OF THE MICROPHONE MEMBRANE

CROSS REFERENCES TO OTHER APPLICATIONS

This is a continuation-in-part of U. S. application Ser. No. 692,051 filed on Dec. 20, 1967, to be issued as U. S. Pat. No. 3,546,469 on Dec. 8, 1970, and of U. S. application Ser. No. 32,160 filed Apr. 27, 1970 now U.S. Pat. No. 3,649,837.

BACKGROUND OF THE INVENTION

U. S. Pat. No. 3,546,469 discloses an optical means for transformation of a displacement into a corresponding electrical signal. The structure taught by U. S. Pat. No. 3,546,469 comprises a light source, optical means to direct a divergent beam of radiation from that light source on a photocell in an arrangement whereby the displacement affects the spacings among light source, photocell and optical means and modifies thus the radiation sensed by the photocell. Since the photocell is of rather small area, the received light flux is generally small, affecting adversely the signal to noise ratio.

A well-known method for electric sound transmission utilizes a pulse coding system, whereby the amplitude of a sequence of electric pulses is modulated in relation to the sound energy.

U. S. application Ser. No. 32,160 teaches the integration of a sensor located in the central zone of a zone plate optics with amplification means encompassing other zones of said zone plate.

BRIEF DESCRIPTION OF THE INVENTION

It is an object of my invention to disclose an optical read-out microphone of improved sensitivity.

It is another object of my invention to disclose an optical read-out microphone providing a pulse coded output.

Briefly, the invention comprises the use of electrically controlled light pulses, whose intensity at the position of a photoelectric sensor is modified by the displacement of the vibrating membrane of the microphone. High sensitivity is achieved by concentrating the light intensity in the pulses rather than distributing it equally over time, and pulse coded electric sound output is obtained as a by-product of my invention. Thus, two desired advances have been combined in a new and unexpected manner.

The sensitivity is further increased by suppressing noise by means of close integration of photoelectric sensor with an amplifier. For a compact and efficient design, sensor and amplifier are placed within the innermost opaque zone of a Fresnel optical system used for focusing the radiation on the photocell.

PREFERRED EMBODIMENT

Figure 1:
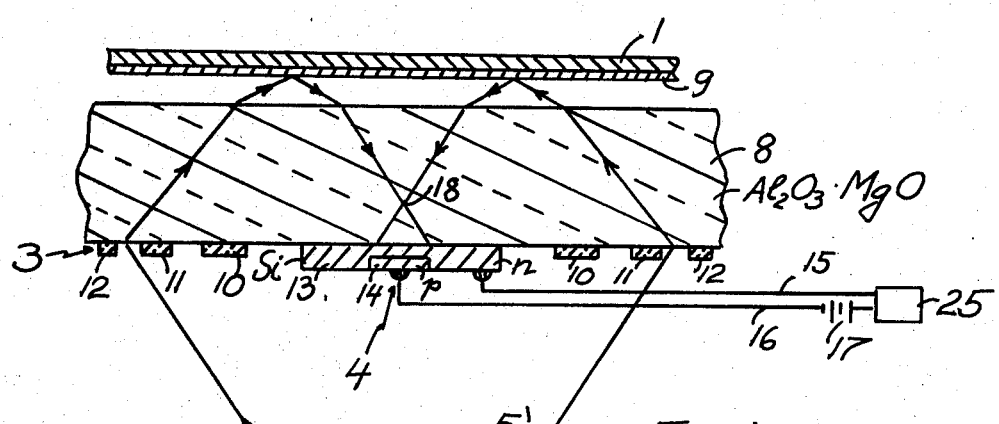
FIG. 1 shows in cross section a pulse coded microphone arrangement according to this invention.

Referring to FIG. 1, there is shown in cross section a portion of the membrane 1 of a microphone, a light source 2, a zone plate optics 3, and a sensor 4 in an optical system indicated by beams 5 and 5'.

Zone plate optics 3 collects beams 5 and 5' onto 4 after reflection on 1. As 1 is displaced upwards or downwards, the position of image point 18 of 2 by means of 3 shifts with respect to location of 4, so that flux incident on 4 depends on displacement. At the rest position of the membrane, the image 18 of 2 differs in location from 4, so that linear response of photocell output to displacement is obtained.

Light source 2 in FIG. 1 is a GaAs p-n junction injection light emitting diode, driven by power source 6. Pulse generator 7 inserted between 6 and 2 provides a series of pulses of peak current 1 amp, duration 0.5 $\mu$sec and repetition rate 10,000 Hz or higher.

Preferably, p-n junction has a diameter of only a few mils and it is centered within hemispherical shaped n-type body 19 of 40 mil diameter to facilitate exit of light from highly refractive GaAs to air without total reflection to occur.

Zone plate 3 is located on transparent substrate 8, e. g., $Al_2O_3$—MgO spinel with alternate zones 10, 11, 12, etc., comprising a transparent deposit to introduce phase shift of one-half of a wavelength with respect to adjoining empty zones. Membrane 1 is provided with reflecting coating 9 on lower surface.

Central zone 13 consists of an epitaxial 2 microns thick n-type silicon layer, having diffused p-island 14. Leads 15, 16 supply electric current to p-n junction sensor 4 from the power supply 17. Output of 4 is fed into load 25.

A zone plate is characterized by number of zones N and focal length F expressed as multiples of vacuum wavelength of light source. For a GaAs light emitter, the wavelength is $\lambda \cong 0.93$ microns. In practice, the ratio of F/N has a lower limit due to the resolution achievable in preparation of the outermost zone. A typical ratio is about 64 corresponding to a resolution of a few wavelengths. Diameter of the innermost zone is chosen to accommodate the sensor and integrated amplifier. Size of sensor is selected to be moderately larger than the so-called Airy disk of zone plate. Distance of light source from zone plate is chosen so that image of light source is about the size of the Airy disk. Sensitivity defined as change in photocell current per unit displacement of membrane, is directly proportional to the light intensity. Thus, using pulsed light generated by 1 amp peak current at duty cycle of 1 in 200, rather than d. c. current of 1/200 amp, the sensitivity is increased by a factor of 200.

Figure 2:
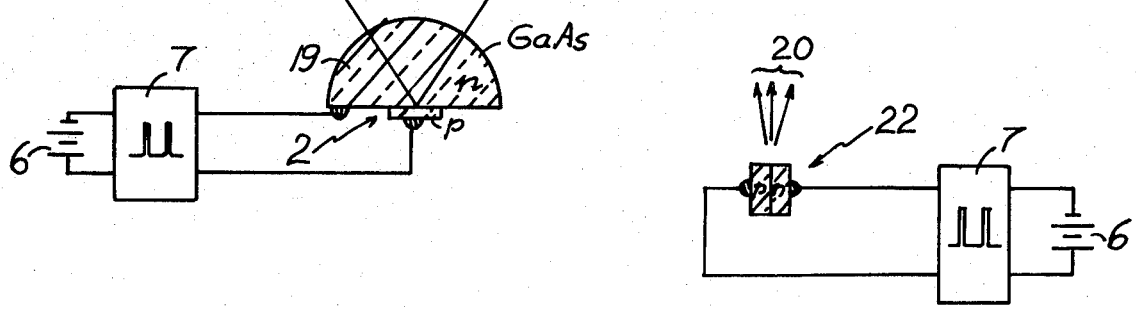
FIG. 2 shows another light source for the pulse coded microphone of FIG. 1.

FIG. 2 shows another choice for light source 2 comprising a p-n junction laser 22. Radiation 20 is emitted along junction plane 21 into a narrow solid angle of a few degrees. Junction plane is aligned with optical axis of the arrangement of FIG. 1. The narrow solid angle of emitted light causes high efficiency in collection of light by zone plate and sensor.

Figure 3:
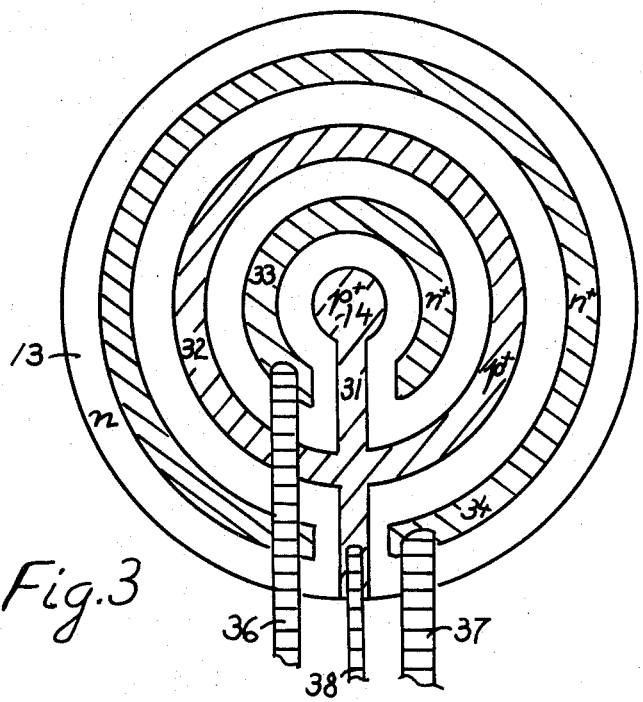
FIG. 3 shows a top view of an integrated arrangement of sensor, amplifier and zone plate optics according to this invention.

FIG. 3 shows the top view of integrated sensor-amplifier design located within the innermost zone 13 of zone plate 3 of FIG. 1. Disk shaped $p^+$ layer 14 of the sensor is connected by p-strip 31 to circular gate 32 of a junction field effect transistor comprising the $n^+$ source 33 and the $n^+$ drain 34, diffused into n-substrate 13. Metallized contact stripes 36 to source, 37 to drain and 38 to gate connect to photocell load resistance 52 and battery terminals shown in FIG. 4. These contact stripes are insulated against substrate by silicon oxide when necessary. A radius of 50 microns for innermost zone is sufficient to accommodate the p-n sensor and junction field effect transistor amplifier of FIG. 3.

Figure 4:
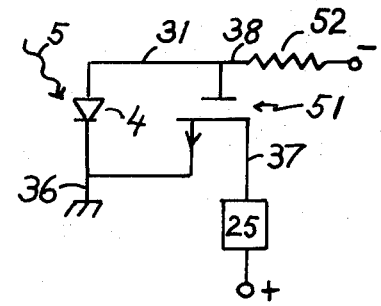
FIG. 4 shows a circuit diagram for the integrated sensor amplifier circuit of FIG. 3.

FIG. 4 shows the equivalent circuit of the amplifier comprising the photo-diode 4, the junction FET 51, and load resistor 52. Connecting leads are designated by numbers used in FIG. 3.

A typical value for the transconductance of 51 is $g_m = 10^{-3}$ mhos, and for the resistor 52 is $R = 10^7$ ohms, so that $g_m R \cong 10^4$. Gate of the field effect transistor is chosen only a few microns wide to enable high frequency performance and to provide a large $g_m$.

Sensitivities of $10^{-8}$ A/micron have been achieved by the sensor using a pulsed GaAs emitter of 1 amp peak current, thus providing currents of $10^{-4}$ A per micron displacement after amplification by the field effect transistor.

Figure 5:
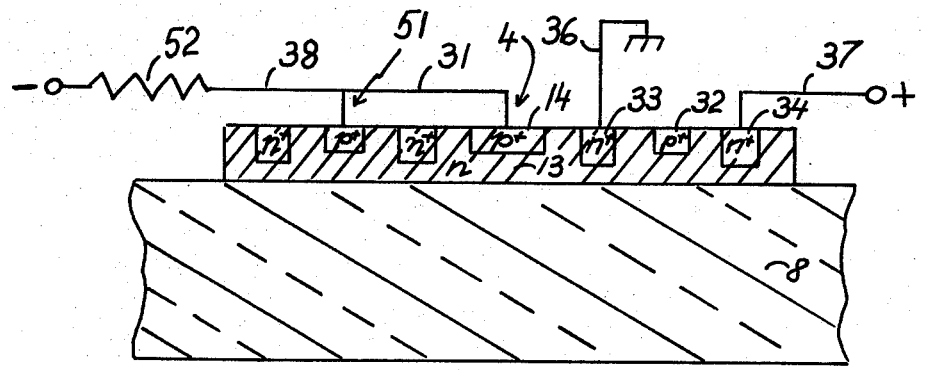
FIG. 5 shows the structure of FIG. 3 in cross section.

FIG. 5 shows the structure of FIG. 3 in cross section. Interconnections 31, 36, 37 and 38 are symbolically indicated above the structure, while, in fact, they are solidly integrated with the structure.

Figure 6:
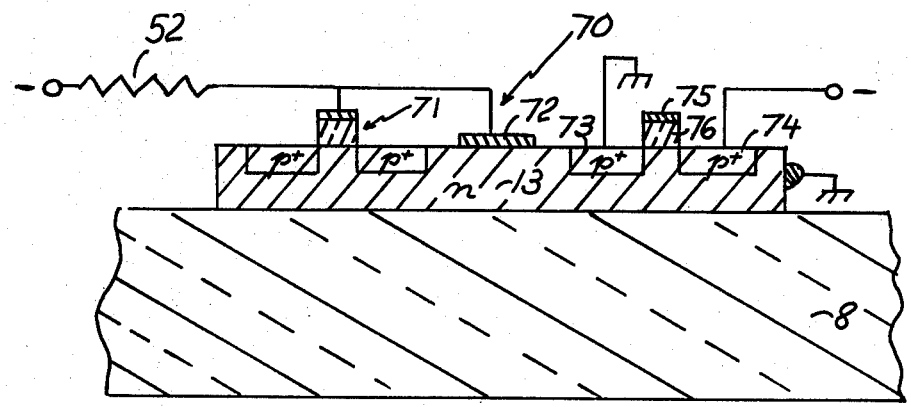
FIG. 6 shows another integrated sensor amplifier in cross section.

FIG. 6 shows in cross section an integrated design of a Schottky barrier sensor 70 surrounded by a ring-shaped insulated gate field effect transistor 71. The sensor comprises the silicon n-body 13 on insulating substrate 8 with Schottky metal contact 72. The field effect transistor comprises $p^+$ source 73, $p^+$ drain 74 and metallized gate 75 separated from 113 by oxide film 76. Interconnections are indicated symbolically outside the semiconducting structure while, in fact, they are solidly integrated with the structure by metallized stripes insulated from substrate where necessary by oxide films. The structure of FIG. 6 can use the same battery for powering the sensor and the amplifier circuit.

Instead of p-n junction sensors or Schottky barriers, n-p-n phototransistors can be used, providing an additional gain factor for the photocurrent due to base current amplification.

Figure 7:
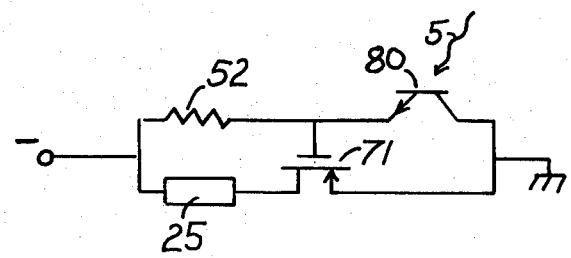
FIG. 7 shows an equivalent circuit for yet another integrated sensor amplifier structure.

FIG. 7 shows the equivalent circuit for a structure such as FIG. 6, except using an n-p-n phototransistor 80 instead of the Schottky barrier sensor 70.

It is also possible to locate the sensor in the central opaque zone of the zone plate, the amplifier in the next opaque zone, and the series resistor 52 to the sensor in another opaque zone.

It should be understood that my invention is not limited to a zone plate optical means. Ordinary lens or mirror optics can be utilized also.

Also, while an arrangement of light source and photocell having an optical axis normal to the membrane is preferred, other arrangements can be used within the scope of my invention. In some arrangements, the rotational component of displacement might be used.

Therefore, my invention is not to be limited by the preferred embodiments, but encompasses all structures described by the following claims.

I claim:

1. A structure for providing pulse coded electric reproduction of the displacement of a body with respect to a fixed reference frame, said structure comprising
   i. an electrically controlled emitter of a sequence of radiation pulses,
   ii. a zone plate lens to direct some of said radiation pulses on a photoelectric sensor, transferring incident said radiation pulses into electrical pulse signals,
   iii. part of the optical system comprising said emitter of radiation pulses, said zone plate lens and said sensor attached to said fixed reference frame and another part attached to said body,
   iv. the principal ray of said optical system oriented substantially in direction of said displacement, whereby the flux of said radiation pulses incident on said sensor is modified by said displacement so that the amplitude of said electrical pulse signals depends on said displacement.

2. The structure of claim 1, whereby said emitter of radiation pulses is a p-n junction semiconducting light source at which voltage pulses are applied.

3. The structure of claim 2, whereby said p-n junction light source is operated in the forward bias regime.

4. The structure of claim 3, whereby said p-n junction light source is operated in the laser regime.

5. The structure of claim 1, whereby said sensor is a semiconducting device.

6. The structure of claim 5, whereby said sensor is located in the central zone of said zone plate lens.

7. The structure of claim 5, whereby said semiconducting sensor is integrated with semiconducting amplifier means.

8. The structure of claim 7, whereby said sensor and at least a portion of said amplifier means are located in the central zone of said zone plate lens.

9. An optoelectric microphone comprising (i) a vibrating membrane, (ii) a periodically pulsed electrically activated light source, (iii) a zone plate optical system which images light from said light source on an electrical sensor for said light, (iv) a portion of the arrangement comprising said light source, said sensor and said optical system attached to a fixed reference frame, and another portion attached to said vibrating membrane, (v) the principal ray of said optical sensor directed substantially perpendicular to said membrane, whereby the vibration of said membrane changes the flux of said light incident from said light source onto said sensor by shifting the image of said light source with respect to the position of said sensor, (vi) said light source operated at a frequency exceeding 1000 Hz, and at a duty cycle substantially less than unity, thereby providing a pulse-coded electrical signal from said sensor in response to said vibration of said membrane.

* * * * *